(12) United States Patent
Wu et al.

(10) Patent No.: US 12,349,225 B2
(45) Date of Patent: Jul. 1, 2025

(54) METHOD AND APPARATUS FOR NODE SELECTION AND ACCESS CONTROL

(71) Applicant: LENOVO (BEIJING) LIMITED, Beijing (CN)

(72) Inventors: Lianhai Wu, Beijing (CN); Jing Han, Beijing (CN); Haiming Wang, Beijing (CN); Hongmei Liu, Beijing (CN); Jie Shi, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 915 days.

(21) Appl. No.: 17/278,824

(22) PCT Filed: Nov. 8, 2018

(86) PCT No.: PCT/CN2018/114644
§ 371 (c)(1),
(2) Date: Mar. 23, 2021

(87) PCT Pub. No.: WO2020/093333
PCT Pub. Date: May 14, 2020

(65) Prior Publication Data
US 2022/0039189 A1 Feb. 3, 2022

(51) Int. Cl.
*H04W 76/19* (2018.01)
*H04L 5/00* (2006.01)
(Continued)

(52) U.S. Cl.
CPC ........... *H04W 76/19* (2018.02); *H04L 5/0048* (2013.01); *H04W 36/0055* (2013.01); *H04W 74/0833* (2013.01); *H04W 80/12* (2013.01)

(58) Field of Classification Search
CPC ............. H04W 76/19; H04W 36/0055; H04W 48/00; H04W 48/12; H04W 48/16;
(Continued)

(56) References Cited

U.S. PATENT DOCUMENTS

| 2013/0183971 A1 | 7/2013 | Tamaki et al. |
| 2016/0227557 A1 | 8/2016 | Fanous et al. |

(Continued)

FOREIGN PATENT DOCUMENTS

| CN | 102223658 B | 6/2016 |
| CN | 107360557 A | 11/2017 |

(Continued)

OTHER PUBLICATIONS

3GPP, 3rd Generation Partnership Project; Technical Specification Group Radio Access Network; PHY layer enhancement for NR IAB, 3GPP R1-1806551, May 2018, pp. 1-17 (Year: 2018).*
International Searching Authority, "Notification of Transmittal of the International Search Report and the Written Opinion of the International Searching Authority, or the Declaration", PCT/CN2018/114644, Nov. 8, 2018, pp. 1-7.

(Continued)

*Primary Examiner* — Romani Ohri
(74) *Attorney, Agent, or Firm* — Kunzler Bean & Adamson

(57) ABSTRACT

The present disclosure relates to methods and apparatuses. According to some embodiments of the disclosure, a method includes: receiving, at an integrated access and backhaul node, a signaling message including a threshold for node selection; selecting a node for re-establishment from at least one suitable node in response to a failure in a backhaul link; and transmitting a re-establishment request to the selected node.

10 Claims, 12 Drawing Sheets

(51) Int. Cl.
*H04W 36/00* (2009.01)
*H04W 74/0833* (2024.01)
*H04W 80/12* (2009.01)

(58) Field of Classification Search
CPC ....... H04W 76/27; H04W 76/38; H04W 8/08; H04L 5/0048
See application file for complete search history.

(56) References Cited

U.S. PATENT DOCUMENTS

| | | | | |
|---|---|---|---|---|
| 2018/0338277 | A1* | 11/2018 | Byun | H04W 74/0833 |
| 2018/0376380 | A1* | 12/2018 | Leroux | H04W 76/18 |
| 2019/0261426 | A1* | 8/2019 | Lee | H04W 48/00 |
| 2021/0051579 | A1* | 2/2021 | Luo | H04W 48/20 |
| 2021/0377832 | A1* | 12/2021 | Wang | H04W 36/0058 |

FOREIGN PATENT DOCUMENTS

| | | |
|---|---|---|
| CN | 108513323 A | 9/2019 |
| WO | 2018177672 A1 | 10/2018 |

OTHER PUBLICATIONS

3GPP, 3rd Generation Partnership Project; Technical Specification Group Radio Access Network; PHY layer enhancement for NR IAB, 3GPP R1-1806551, May 2018, pp. 1-17.
3GPP, 3rd Generation Partnership Project; Technical Specification Group Radio Access Network; Initial consideration on dynamic route selection, 3GPP R2-1804996, Apr. 2018, pp. 1-4.
3GPP, 3rd Generation Partnership Project; Technical Specification Group Radio Access Network; Discussion on IAB topology adaptation with Tree and DAG topology, 3GPP R2-1812708, Aug. 2018, pp. 1-4.

* cited by examiner

METHOD AND APPARATUS FOR NODE SELECTION AND ACCESS CONTROL

TECHNICAL FIELD

The present disclosure generally relates to wireless communication technology, especially for handling node selection and access control in a wireless communication system.

BACKGROUND

In the 3rd Generation Partnership Project (3GPP), deployment of Integrated Access and Backhaul (hereinafter referred to as "IAB") Nodes in a wireless communication system is promoted. One of the main objectives for deploying IAB nodes is to enhance coverage area of a Base Station (hereinafter referred to as "BS") by improving throughput of a mobile device (also known as a user equipment (UE)) that locates in a coverage hole or far from the BS, resulting in low signal quality.

In a wireless communication system employing IAB nodes, a BS that can provide connection to at least one IAB nodes is called an IAB donor. An IAB node is connected to an IAB donor by a backhaul link. The IAB node may hop through one or more IAB nodes before reaching the IAB donor, or may be directly connected to the IAB donor. A procedure for selecting a node to re-establish a backhaul link in response to a failure in the backhaul link is desirable. Moreover, there is a need for handling the connection request when backhaul links or IAB donors are overloaded.

SUMMARY OF THE DISCLOSURE

An embodiment of the present disclosure provides a method, including: receiving, at an integrated access and backhaul node, a signaling message including a threshold for node selection; selecting a node for re-establishment from at least one suitable node in response to a failure in a backhaul link; and transmitting a re-establishment request to the selected node.

Another embodiment of the present disclosure provides a method, including: receiving a signaling message indicating an access barring indication at a node; and broadcasting information indicating whether access to the node is barred according to the signaling message.

Yet another embodiment of the present disclosure provides a method, including: receiving an access request message from an integrated access and backhaul node, wherein the access request message includes cause indication for a failure in a backhaul link; and permitting or rejecting the access request.

Yet another embodiment of the present disclosure provides a method, including: transmitting a first signaling message indicating an access barring indication at a node.

Embodiments of the present disclosure also provide an apparatus. According to an embodiment of the present disclosure, the apparatus includes: a non-transitory computer-readable medium having computer executable instructions stored therein; at least one receiving circuitry; at least one transmitting circuitry; and at least one processor coupled to the non-transitory computer-readable medium, the at least one receiving circuitry and the at least one transmitting circuitry, wherein the computer executable instructions are programmed to implement a method according to an embodiment of the present disclosure with the at least one receiving circuitry, the at least one transmitting circuitry and the at least one processor.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

DETAILED DESCRIPTION

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Figure 1:
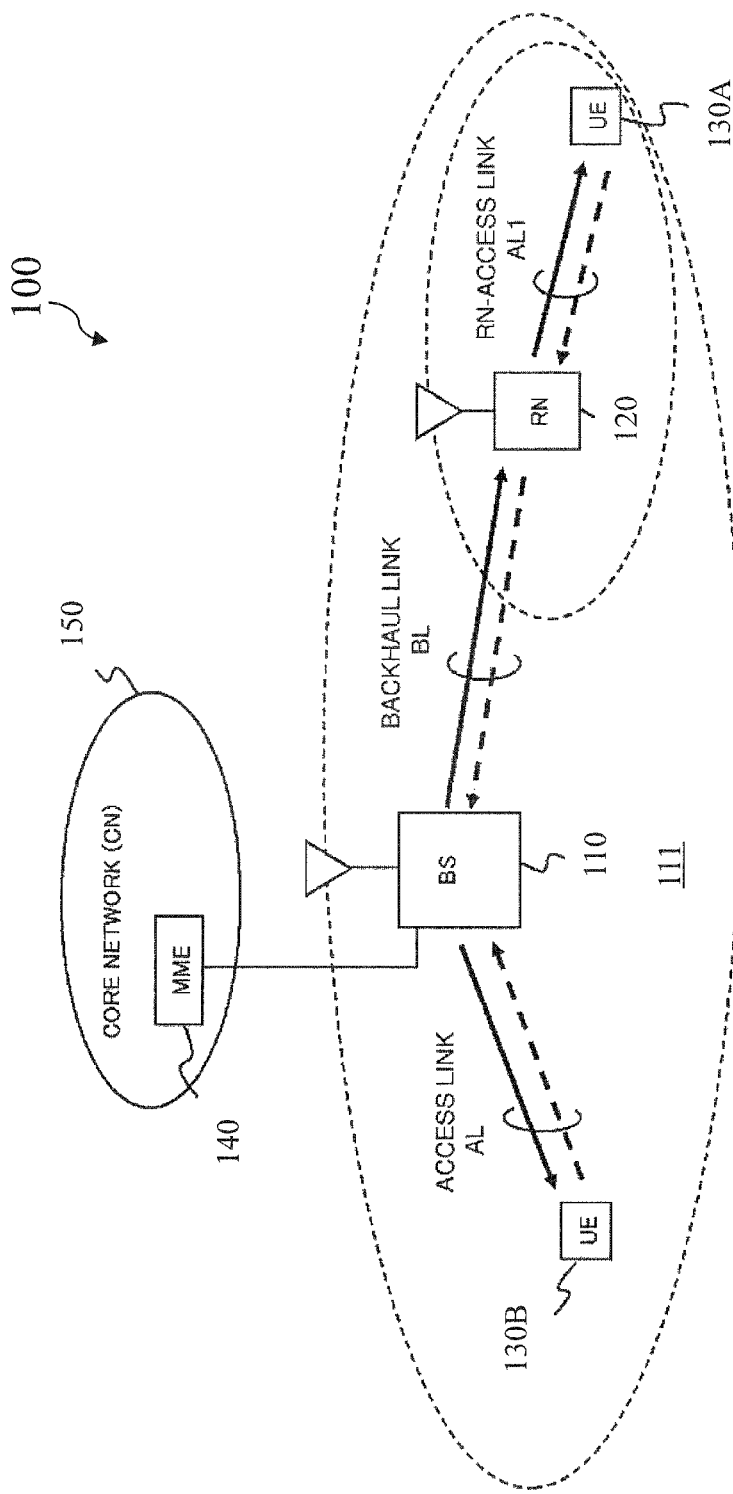
FIG. 1 illustrates a schematic wireless communication system according to an embodiment of the present disclosure.

FIG. 1 illustrates a wireless communication system 100 according to an embodiment of the present disclosure.

As shown in FIG. 1, it is assumed for simplicity that the wireless communication system 100 includes a plurality of nodes including BS 110, RN 120; and a plurality of UEs including UEs 130A and 130B. It should be noted that the wireless communication system 100 may also include of a plurality of BSs and/or a plurality of RNs.

The BS 110 operates under the control of a Mobility Management Entity (MME) 140 and is connected to a Core Network (CN) 150. The core network also includes a Home Subscriber Server (HSS) (not shown), which is in communication with the MME. The BS 110 may be based, for example, on the standards of Long-Term Evolution (LTE), LTE-Advanced (LTE-A), New Radio (NR), or other suitable standards. For example, the BS 110 may be an eNB or a gNB, and may define one or more cells, such as cell 111. UEs 130A and/or 130B may be a computing device, a wearable device, or a mobile device, etc. Persons skilled in the art should understand that as the 3GPP (3rd Generation Partnership Project) and communication technology develop, the terminologies recited in the specification may change, which should not affect the principle of the disclosure.

BS 110 provides radio protocol Layer-1 (Physical Layer) to Layer-3 (Radio Resource Control (RRC) Layer) connections to the UE 130B and the RN 120 through an Access Link (AL) and a Backhaul Link (BL), respectively. In some embodiments of the present disclosure, the RN 120 provides radio protocol Layer-1 to Layer-3 connections to the UE 130A through a RN-access link (AL1). In other embodiments of the present disclosure, the RN 120 provides radio protocol Layer-1 to Layer-2 connections to the UE 130A through the ALL Since RN 120 is connected to BS 110 by the BL, the BS 110 and the RN 120 correspond to the above-mentioned Donor BS and RN, respectively. Although FIG. 1 shows that the Donor BS 110 and the RN 120 are respectively connected to a single UE, both Donor BS 110 and RN 120 are capable of providing connections to multiple UEs.

Relaying function enables an operator to improve and extend the coverage of a BS by having RN wirelessly connected to the BS. Evolved Universal Terrestrial Radio Access Network (E-UTRAN) supports relaying by having a RN wirelessly connect to an eNB serving the RN, called Donor eNB (DeNB), via a modified version of the Evolved Universal Terrestrial Radio Access (E-UTRA) radio interface, i.e. the BL, also referred to as the Un interface. The radio interface that provides radio protocol connection between RN and the UE is referred to as the Uu interface. The relaying function and use of RN/DeNB entities in a network is transparent to the operations of the UEs connected.

3GPP is envisioning an IAB architecture for the 5G (NR) communication networks supporting multi-hop relays. That is, an IAB node may hop through one or more IAB nodes before reaching the IAB Donor. Single hop should be considered a special case of multiple hops. Multi-hop backhauling is beneficial since it provides larger range extension than single-hop backhauling. Higher frequency bands, such as frequency bands above 6 GHz, have limited range of radio signals, and can profit from such larger range extension. Multi-hop backhauling further enables backhauling around obstacles, e.g., buildings in urban environments for in-clutter deployments.

The maximum number of hops in a deployment is expected to depend on a plurality of factors such as frequency, cell density, propagation environment, and traffic load. These factors are expected to change over time. Therefore, from the perspective of the network architecture, it is desirable to ensure the flexibility in hop count. On the other hand, as the number of hops increases, scalability issues may arise. For example, performance may degrade and/or signaling load may increase to unacceptable levels.

Figure 2:
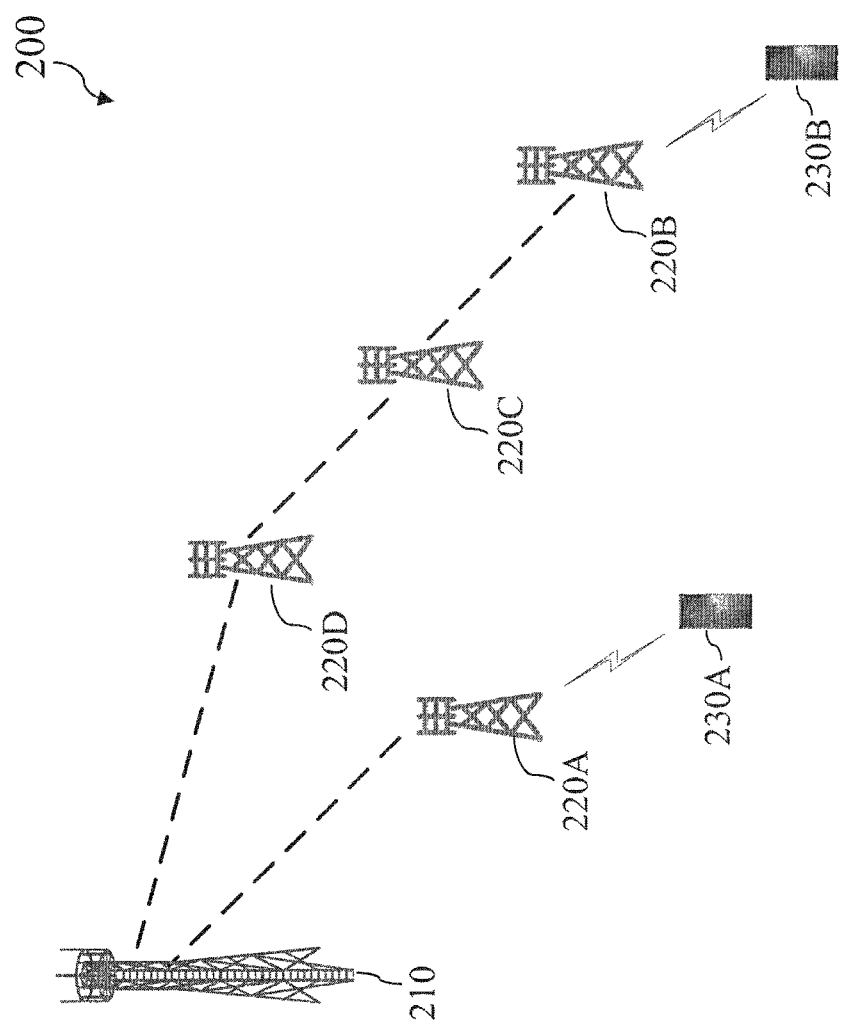
FIG. 2 illustrates a schematic wireless communication system according to an embodiment of the present disclosure.

FIG. 2 illustrates a wireless communication system 200 according to an embodiment of the present disclosure. As shown in FIG. 2, it is assumed for simplicity that the wireless communication system 200 includes a plurality of nodes, including a Donor node, i.e., IAB Donor 210; a plurality of IAB nodes including IAB node 220A, IAB node 220B, IAB node 220C, and IAB node 220D; and a plurality of access nodes including UE 230A and UE 230B. It should be noted that the wireless communication system 200 may also include a plurality of Donor nodes.

In FIG. 2, it is assumed for simplicity that IAB node 220A and IAB node 220D are directly connected to the same Donor node, i.e., IAB Donor 210. Please note that IAB node 220A and IAB node 220D may be connected to different Donor nodes. IAB node 220C can reach IAB Donor 210 by hopping through IAB node 220D. IAB node 220D is a parent IAB node of IAB node 220C. In other words, IAB node 220C is a child node of IAB node 220D. IAB node 220B can reach IAB Donor 210 by hopping through IAB node 220C and IAB node 220D. IAB node 220C and IAB node 220D are upstream IAB nodes of IAB node 220B, and IAB node 220C is a parent IAB node of IAB node 220B. In other words, IAB node 220B is the child node of IAB node 220C and IAB node 220B and IAB node 220C are downstream IAB nodes of IAB node 220D. UE 230A and UE 230B directly connect to IAB node 220A and IAB node 220B, respectively. Please note that a plurality of UEs (not shown) may be directly connected to IAB node 220A, IAB node 220B, IAB node 220C, and IAB node 220D, respectively. In addition, a plurality of IAB nodes may be directly connected to IAB node 220A, IAB node 220B, IAB node 220C, and IAB node 220D.

Figure 3:
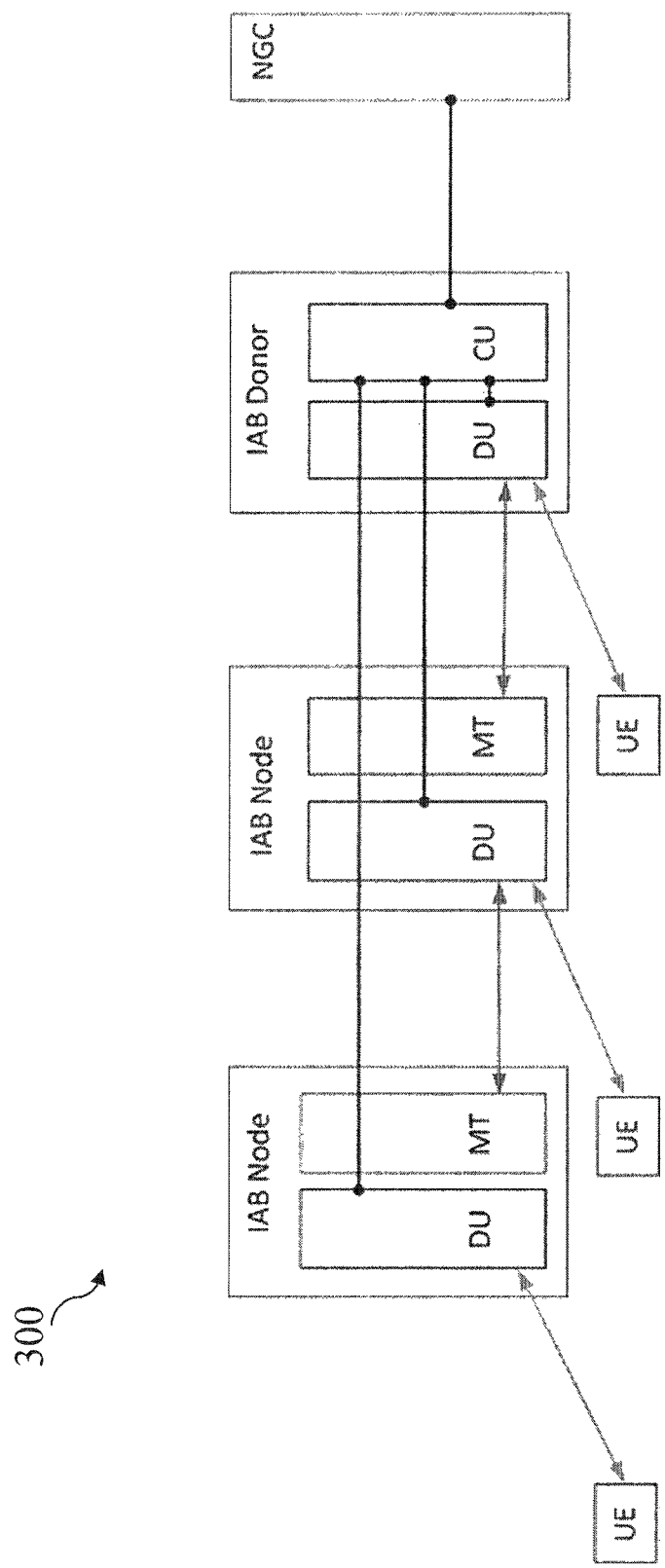
FIG. 3 illustrates a schematic wireless communication system according to an embodiment of the present disclosure.

FIG. 3 illustrates a wireless communication system 300 according to an embodiment of the present disclosure.

As shown in FIG. 3, the IAB nodes and the UEs may be connected to a Next-Generation Core (NGC). Each IAB node may include a Distributed Unit (DU) and a Mobile Termination (MT). In the context of this disclosure, MT is referred to as a function residing on an IAB node that terminates the radio interface layers of the backhaul Uu interface toward an IAB donor or other IAB nodes. The IAB nodes may be connected to an upstream IAB node or a BS, i.e., the IAB donor, via the MT, and may be connected to the UEs and a downstream IAB node via the DU. The IAB nodes in FIG. 3 may sometimes be referred to as Layer-2 (L2) IAB nodes. In some embodiments of the present disclosure, the IAB nodes in FIG. 2, e.g., IAB node 220A, IAB node 220B, IAB node 220C, and IAB node 220D, may be L2 IAB nodes.

The BS, i.e., IAB donor, may include at least one DU to support UEs and MTs of downstream IAB nodes. The BS may further include a Central Unit (CU) for the DUs of all IAB-nodes and for its own DU. A CU and a DU of the BS are connected via F1 interface. In other words, the F1 interface provides means for interconnecting a CU and a DU of a BS. The F1 Application Protocol (F1AP) supports the functions of F1 interface by certain F1AP signaling procedures.

The CU of the BS is a logical node hosting RRC, Service Data Adaptation Protocol (SDAP) and Packet Data Convergence Protocol (PDCP) layers of the BS. The DU of the BS is a logical node hosting Radio Link Control (RLC) layer, Medium Access Control (MAC) layer and Physical layer (PHY) of the BS. One DU of a BS supports at least one cell. One cell is supported by only one DU of a BS or DU of an IAB node. In some embodiments of the present disclosure, the BS in FIG. 3 may be a gNB.

Figure 4:
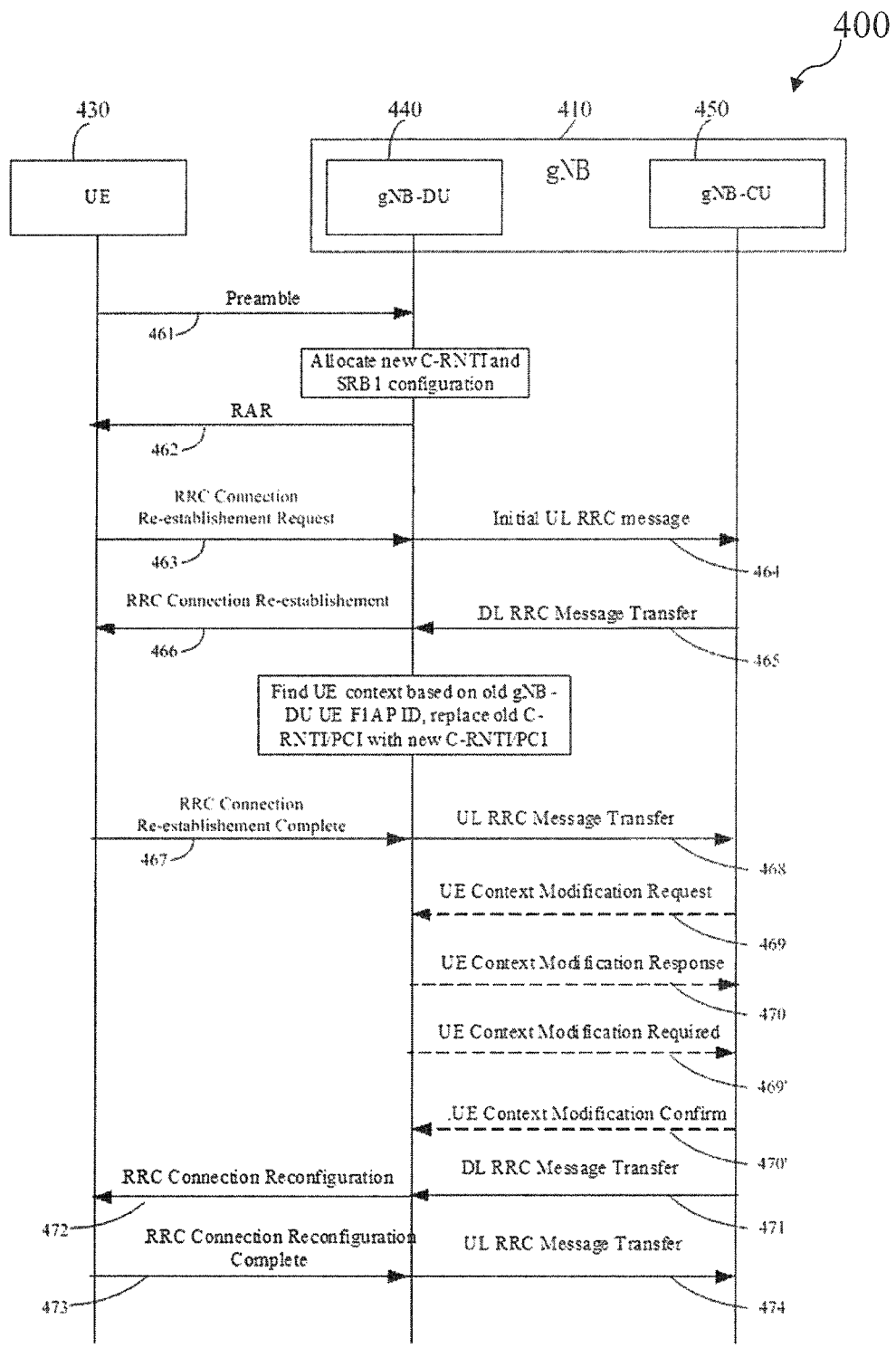
FIG. 4 illustrates a sequence diagram of an exemplary connection re-establishment procedure according to an embodiment of the present disclosure.

FIG. 4 illustrates a sequence diagram of an exemplary RRC connection re-establishment procedure 400 for a UE according to an embodiment of the present disclosure. In some embodiments of the present disclosure, the procedure in FIG. 4 may occur in response to a Radio Link Failure (RLF) on a radio link between a UE, e.g., UE 430 in FIG. 4 and a BS, e.g., gNB 410 in FIG. 4. The gNB 410 may include a DU, e.g., NB-DU 440 and a CU, e.g., gNB-CU 450. The CU and the DU may be co-located or may be located in different positions. The gNB 410 may be an example of aspects of the IAB Donor described with reference to FIG. 3.

In FIG. 4, the procedure 400 includes several messages, including a first message (Msg1) transmitted by the UE 430 to the gNB 410 at step 461, a second message (Msg2) transmitted by the gNB 410 to the UE 430 at step 462, and a third message (Msg3) transmitted by the UE 430 to the gNB 410 at step 463. The procedure 400 further includes several F1AP signaling procedures, including RRC Message Transfer procedures at steps 464, 465, 468, 471, and 474.

Specifically, at step 461, the UE 430 may transmit a preamble such as a random access preamble to the gNB 410 via Msg1. In response to the random access preamble, the gNB-DU 440 may allocate resources such as new Cell Radio Network Temporary Identifier (C-RNTI) and Signaling Radio Bearer 1 (SRB 1) configuration for the UE. At step 462, the gNB-DU 440 may transmit a random access response (RAR) message to the UE. The RAR message may include the new C-RNTI, SRB 1 configuration, and other information.

At step 463, the UE may transmit an RRC Connection Re-establishment Request message to the gNB-DU 440 via Msg3. The RRC Connection Re-establishment Request message may include information such as the old C-RNTI and the old Physical Cell ID (PCI). At step 464, the gNB-DU 440 may transmit an Initial UL RRC Message to the gNB-CU 450. The Initial UL RRC Message may include information such as the new C-RNTI and the RRC Connection Re-establishment Request message from the UE. At step 465, the gNB-CU 450 may transmit a DL RRC Message Transfer message including the old gNB-DU F1AP UE ID to the gNB-DU 440. The DL RRC Message Transfer message may further include a RRC Connection Re-establishment message. Then, the gNB-DU 440 may find the UE context based on the old gNB-DU F1AP UE ID, and replace the old C-RNTI and old PCI with the new C-RNTI and new PCI, respectively. At step 466, the gNB-DU 440 may transmit the RRC Connection Re-establishment message to the UE.

At step 467, the UE 430 may transmit a RRC Connection Re-establishment Complete message to the gNB-DU 440. At step 468, the gNB-DU 440 may encapsulate the received RRC message in a UL RRC Message Transfer message and transmit it to the gNB-CU 450.

At step 471, the gNB-CU 450 may transmit a DL RRC Message Transfer message including a RRC Connection Reconfiguration message to the gNB-DU 440. At step 472, the gNB-DU 440 may forward the RRC Connection Reconfiguration message to the UE 430. At step 473, the UE may transmit a RRC Connection Reconfiguration Complete message to the gNB-DU 440. At step 474, the gNB-DU 440 may forward the RRC Connection Reconfiguration Complete message to the gNB-CU 450.

In some embodiments of the present disclosure, the procedure 400 may further include steps 469 and 470. At step 469, the gNB-CU 450 may trigger a UE context modification procedure by transmitting a UE Context Modification Request message to the gNB-DU 440. The request may include a list of Data Radio Bearers (DRBs) to be modified and released. At step 470, the gNB-DU 440 may respond with a UE Context Modification Response message.

In some embodiments of the present disclosure, the procedure 400 may further include steps 469' and 470'. At step 469', the gNB-DU 440 may trigger a UE context modification procedure by sending a UE Context Modification Required message to the gNB-CU 450. The message may include a list of DRBs to be modified and released. The gNB-CU 450 may respond with a UE Context Modification Confirm message.

In some embodiments of the present disclosure, the procedure 400 may include both steps 469 and 470 and steps 469' and 470'.

It should be noted that in the above procedures, it is assumed that the UE attempts to connect the original gNB-DU where the UE contexts are available for this UE. In the case that the UE attempts to connect a new gNB-DU other than the original one, the gNB-CU should initiate a UE context setup procedure with this new gNB-DU. The UE context setup procedure is described in 3GPP specification TS 38.473.

Figure 5:
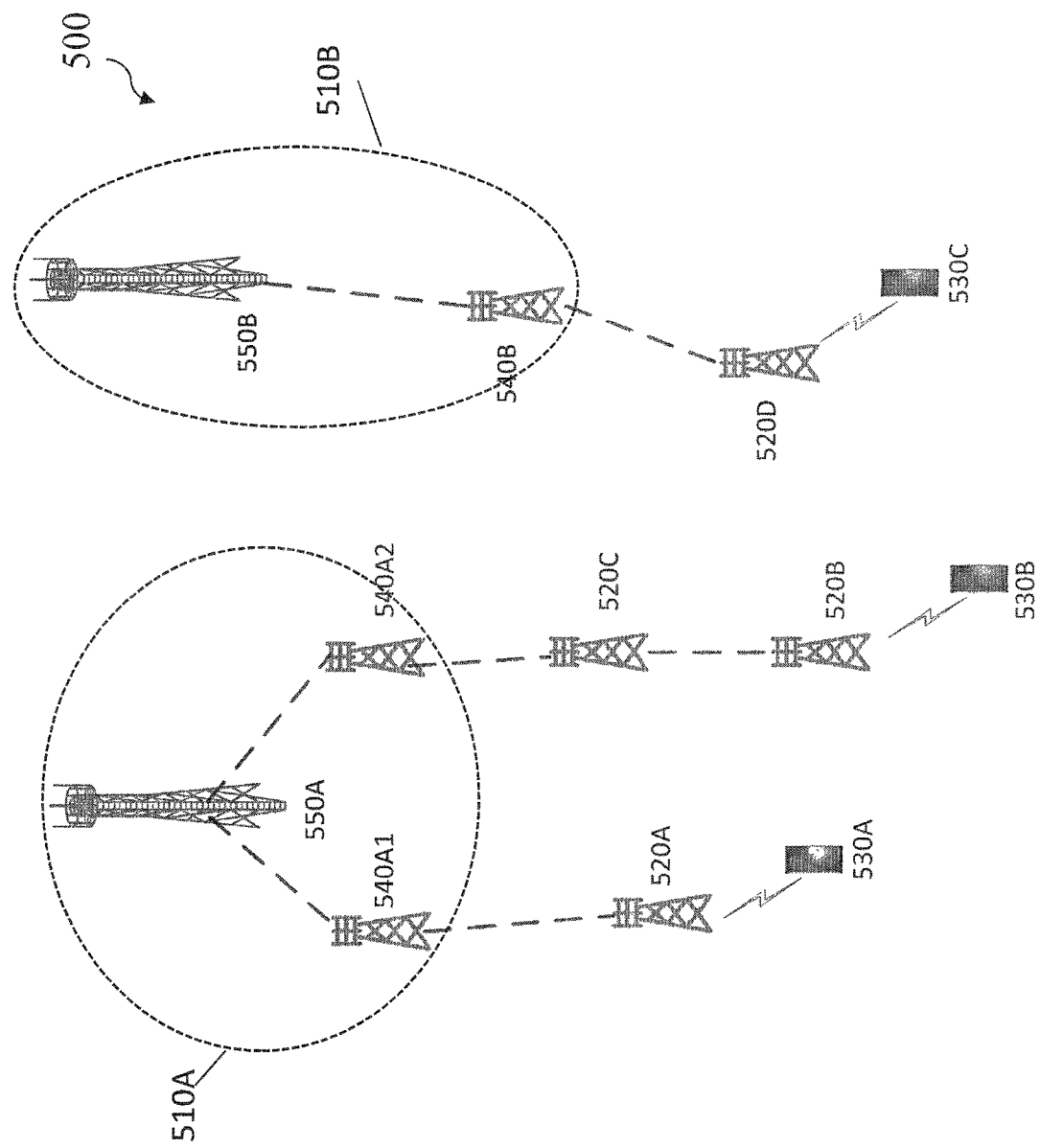
FIG. 5 illustrates a schematic wireless communication system according to an embodiment of the present disclosure.

FIG. 5 illustrates a wireless communication system 500 according to an embodiment of the present disclosure. As shown in FIG. 5, it is assumed for simplicity that the wireless communication system 500 includes a plurality of nodes. The plurality of nodes may include a plurality of BSs including gNB 510A and 510B, a plurality of IAB nodes including IAB node 520A, IAB node 520B, IAB node 520C, and IAB node 520D, and a plurality of access nodes including UE 530A, UE 530B, and UE 530C. The gNB 510A may include a CU, i.e., gNB-CU 550A, and two DUs i.e., gNB-DU 540A1 and gNB-DU 540A2. The gNB 510B may include a CU, i.e., gNB-CU 550B, and a DU, i.e., gNB-DU 540B. Each of the DUs, e.g., gNB-DU 540A1, gNB-DU 540A2, and gNB-DU 540B supports at least one cell. The CU and the DU may be co-located or may be located in different positions. The gNB 510A and 510B may be an example of aspects of the IAB Donor described with reference to FIG. 3.

In a wireless communication system supporting multi-hop relays, the wireless backhaul links may be broken, for example, due to some reasons such as blockage by moving objects such as vehicles, foliage (caused by seasonal changes), or new buildings (caused by infrastructure changes). Physically stationary IAB nodes may suffer from this problem.

For example, as shown in FIG. 2, a RLF may occur on the backhaul link between IAB Donor 210 and IAB node 220D. In this example, IAB node 220D may switch to another Donor node (not shown) from current IAB Donor. In another example, a RLF may occur on the backhaul link between two IAB nodes, such as IAB node 220D and IAB node 220C. In this example, IAB node 220C may switch to a candidate IAB node, such as IAB node 220A, from IAB node 220D.

In another example, referring to FIG. 5, a RLF may occur on the backhaul link between gNB-DU 540A2 and IAB node 520B. In this example, IAB node 520B may initialize a re-establishment procedure, select a candidate node to re-establish the backhaul link, and access to the candidate node. For example, IAB node 520B may switch from IAB node 520C to one of its neighboring nodes, for example, IAB node 520A, IAB node 520D, an IAB node (not shown) connected to gNB-DU 540A2, and gNB-DU 540B, suitable for backhaul link re-establishment.

Therefore, a procedure for selecting a candidate node in the wireless communication system is desirable. Such procedure may be applied to the re-establishment procedures as described above.

Moreover, traffic variations may cause uneven load distribution on the wireless backhaul links, which would lead to congestion on local links or nodes. For example, referring to FIG. 5, the traffic load on the backhaul link between gNB-DU 540A1 and IAB node 520A or the traffic load on the gNB-CU 550A or gNB-CU 550B may be too heavy. In addition, there is no candidate node to offload the traffic. A procedure for handling the connection request when backhaul links or the BSs are overloaded is desirable.

In addition, when an IAB node attempts to connect to a candidate node in response to a failure in the backhaul link, and the candidate node is connected to a new gNB-CU different from the original gNB-CU to which the IAB node was previously connected, the new gNB-CU may handover the IAB node back to the original gNB-CU. There is a need for handling the above scenario.

Embodiments of the present disclosure propose technical solutions for node selection, which can at least solve the above technical problems in the new generation communication systems, such as 5G communication systems. More details on the embodiments of the present disclosure will be illustrated in the following text in combination with the appended drawings.

Figure 6:
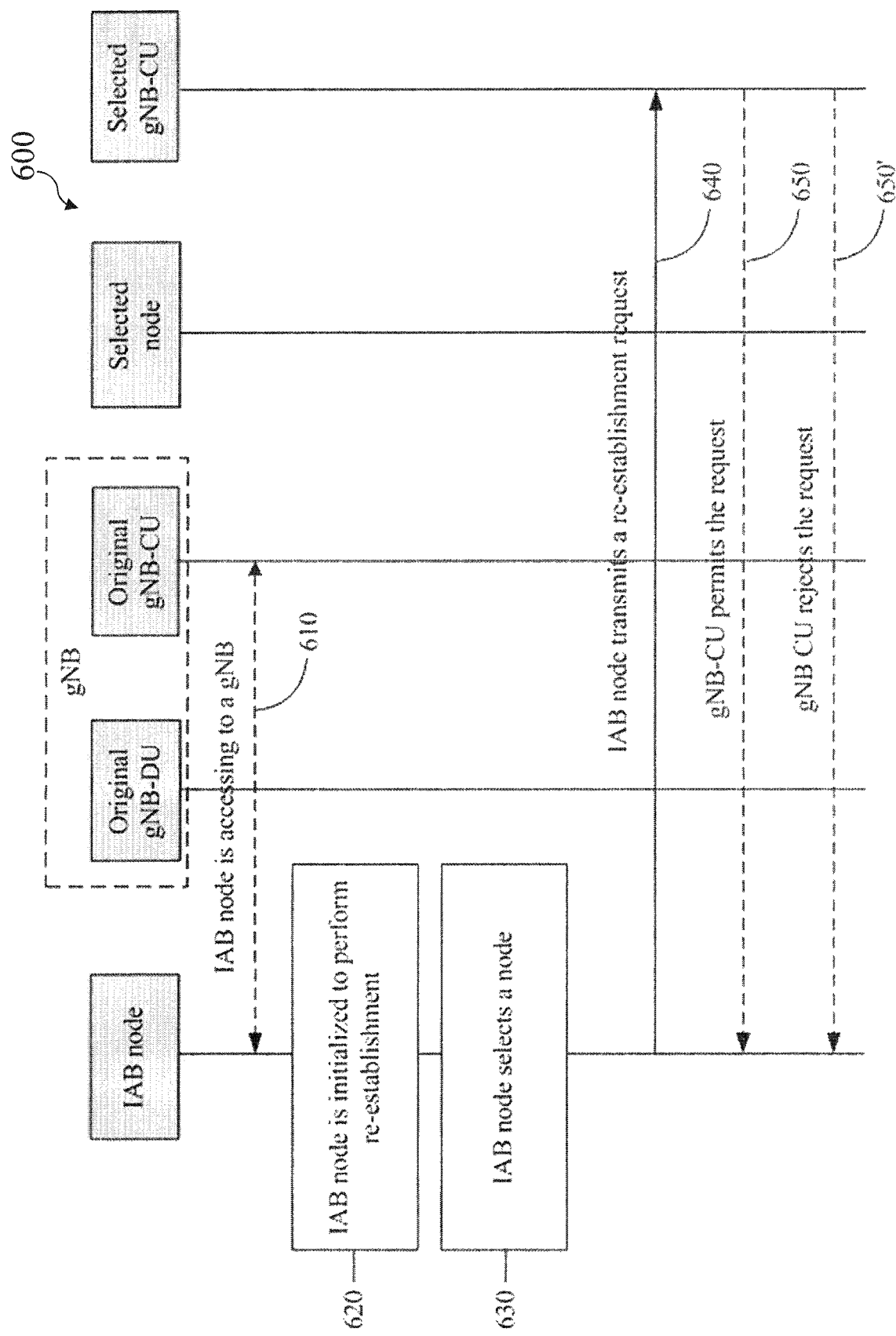
FIG. 6 illustrates a flow chart of an exemplary procedure for handling a failure in a backhaul link according to an embodiment of the present disclosure.

FIG. 6 illustrates a flow chart of an exemplary procedure 600 for handling a failure in a backhaul link according to an embodiment of the present disclosure.

In FIG. 6, at step 610, an IAB node is accessing to a gNB including a gNB-CU and at least one gNB-DU. The gNB-CU is hereinafter referred to as "original gNB-CU." The gNB-DU among the at least one gNB-DU to which the IAB node is connected is hereinafter referred to as "original gNB-DU." For example, referring to FIG. 5, at the beginning, IAB node 520B and IAB node 520C are accessing to gNB-CU 550A. In this example, the original gNB-CU is gNB-CU 550A, and the original gNB-DU is gNB-DU 540A2.

In some embodiments of the present disclosure, the original gNB-CU may transmit a signaling message including a threshold for node selection to the IAB node. In another embodiment of the present disclosure, the original gNB-CU may transmit a signaling message including the threshold for node selection to at least one of the at least one gNB-DU. In an embodiment of the present disclosure, the signaling message may include information for F1AP signaling. For example, referring to FIG. 5, IAB node 520B, gNB-DU 540A1 or gNB-DU 540A2 may receive a signaling message including a threshold for node selection. The threshold for node selection will be described in detail later.

At step 620, the IAB node may initialize a re-establishment procedure. The re-establishment procedure may be triggered by a RLF on the backhaul link between the IAB node and the gNB. For example, referring to FIG. 5, a RLF may happen on the backhaul link between IAB node 520B and gNB 510A. In other words, a RLF may happen on the backhaul link between IAB node 520B and gNB-DU 540A2. IAB node 520B may initialize a re-establishment procedure in response to the RLF.

At step 630, the IAB node may select a node for performing the re-establishment procedure from at least one suitable node. The at least one suitable node may be an IAB node or a gNB-DU. The gNB-DU may be the original gNB-DU or a new gNB-DU different from the original gNB-DU. The at least one suitable node and the IAB node may be connected to the original gNB-CU or a new gNB-CU different from the original gNB-CU. For example, referring to FIG. 5, in response to a RLF on the backhaul link between the IAB node 520B and gNB-DU 540A2, the IAB node 520B may select one or more node from IAB node 520A, IAB node 520D, IAB node 520E (not shown), and gNB-DU 540B as the at least one suitable node according to the method described above.

In some embodiments of the present disclosure, the IAB node may determine a node as a suitable node for re-establishment in the case that it is determined that the channel quality of the channel between the IAB node and the node is equal to or greater than the threshold for node selection.

The channel quality of a channel may be determined based on at least one or more of the following: Reference Signal Received Power (RSRP), Reference Signal Strength Indicator (RSSI), or Reference Signal Receiving Quality (RSRQ). Other channel quality metrics may also be employed.

In some embodiments of the present disclosure, the IAB node may determine a node as a suitable node based on node priority. For example, a node connected to the same BS as the IAB node may have a higher node priority than a node connected to a different BS than the IAB node. In an embodiment of the present disclosure, the at least one suitable node and the IAB node are connected to the same BS. In another embodiment of the present disclosure, each of the at least one suitable node is connected to a different BS than the IAB node. In the above embodiments, the BS may refer to the CU of the IAB Donor as described above with respect to FIG. 3.

In some embodiments of the present disclosure, there may be only one suitable node. The IAB node may select this suitable node for performing the re-establishment procedure. In some embodiments, there may be a plurality of suitable nodes. In one embodiment of the present disclosure, the IAB node may randomly select the node for re-establishment from the plurality of suitable nodes with equal probability. In another embodiment of the present disclosure, the IAB node may select one of the plurality of suitable nodes which has the best channel quality condition as the node for re-establishment. For example, the IAB node may sort the plurality of suitable nodes according to their channel quality conditions, and may select one of the plurality of suitable nodes as the node for re-establishment according to a best channel quality.

In a preferred embodiment of the present disclosure, the IAB node may determine whether there is any candidate node available for backhaul link re-establishment. For example, it is checked whether there are neighboring IAB nodes available for backhaul link re-establishment. In the case that it is determined that there is no available candidate node, the IAB node may transmit a signaling message indicating the failure in the backhaul link to its downstream nodes.

Otherwise, in the case that it is determined that there are at least one candidate node for backhaul link re-establishment, the IAB node may determine a first group of suitable nodes from the at least one candidate node. For example, the IAB node may determine a node as a suitable node for re-establishment in the case that it is determined that the channel quality of the channel between the IAB node and the node is equal to or greater than the threshold for node selection. The IAB node may further determine a second group of suitable nodes from the first group of suitable nodes based on node priority that the suitable node connected to the same BS as the IAB node should be selected in priority. In one example, each node in the second group of suitable nodes and the IAB node may be connected to the same BS. In another example, each node in the second group of suitable nodes may be connected to a different BS than the IAB node if there is no suitable node connected to the same BS as the IAB node. Then, the IAB node may select a node for re-establishment from the second group of suitable nodes. In one example, the IAB node may randomly select the node for re-establishment from the second group of suitable nodes. In another example, the IAB node may select a node which has the best channel quality condition from the second group of suitable nodes as the node for re-establishment.

At step 640, the IAB node may transmit a re-establishment request to the selected node. In some embodiments of the present disclosure, the selected node may transmit the re-establishment request to a corresponding gNB-CU (hereinafter referred to as "selected gNB-CU"). As stated above, the selected gNB-CU may be the original gNB-CU or a new gNB-CU different from the original gNB-CU. In some embodiments of the present disclosure, the IAB node and the selected node may transmit the re-establishment request according to the procedure as described above with respect to FIG. 4.

In some embodiments of the present disclosure, the re-establishment request may include cause indication for the RLF in the backhaul link. That allows the selected gNB-CU to be aware of the occurrence of the RLF in the backhaul link, such that the selected gNB-CU would not handover the IAB node back to the original gNB-CU. Accordingly, this is advantageous when the selected gNB-CU is different from the original gNB-CU.

In some embodiments of the present disclosure, the IAB node may transmit assistant information to the selected node. In some embodiments of the present disclosure, the assistant information includes at least one of the following: load information of the IAB node, and at least one attribute of the IAB node. In an embodiment of the present disclosure, the at least one attribute includes the priority of the IAB node, which may indicate that the IAB node is of low, medium, or high priority. In some embodiments of the present disclosure, the assistant information is transmitted via Msg3 during a random access procedure as described above with respect to FIG. 4.

After receiving the re-establishment request, the selected gNB-CU may determine whether or not to admit the access from the IAB node. For example, at step 650, the selected gNB-CU may permit the re-establishment request. Alternatively, at step 650', the selected gNB-CU may reject the re-establishment request. In some embodiments of the present disclosure, the determination of whether or not to admit the access is based on the assistant information or other information. In an embodiment of the present disclosure, in the case that the selected gNB-CU is overloaded, the selected gNB-CU may reject the re-establishment request. In another embodiment of the present disclosure, in the case that the IAB node has a medium or high priority, the selected gNB-CU may allow the IAB node to access regardless of the load status of the selected gNB-CU. For example, in the case that the selected gNB-CU is overloaded and the IAB node requiring to access has a high priority, the selected gNB-CU may instruct the corresponding cell, to which the IAB node is to be connected, to release nodes that have a lower priority. After the load of the selected gNB-CU is reduced by releasing node(s) with lower priority, the IAB node with higher priority can be allowed to access the selected gNB-CU or the corresponding cell.

As stated above, traffic variations may cause uneven load distribution on the wireless backhaul links, which would lead to congestion on local links or nodes. A procedure for handling new connection requests when backhaul links or a BS is overloaded is desirable.

Figure 7:
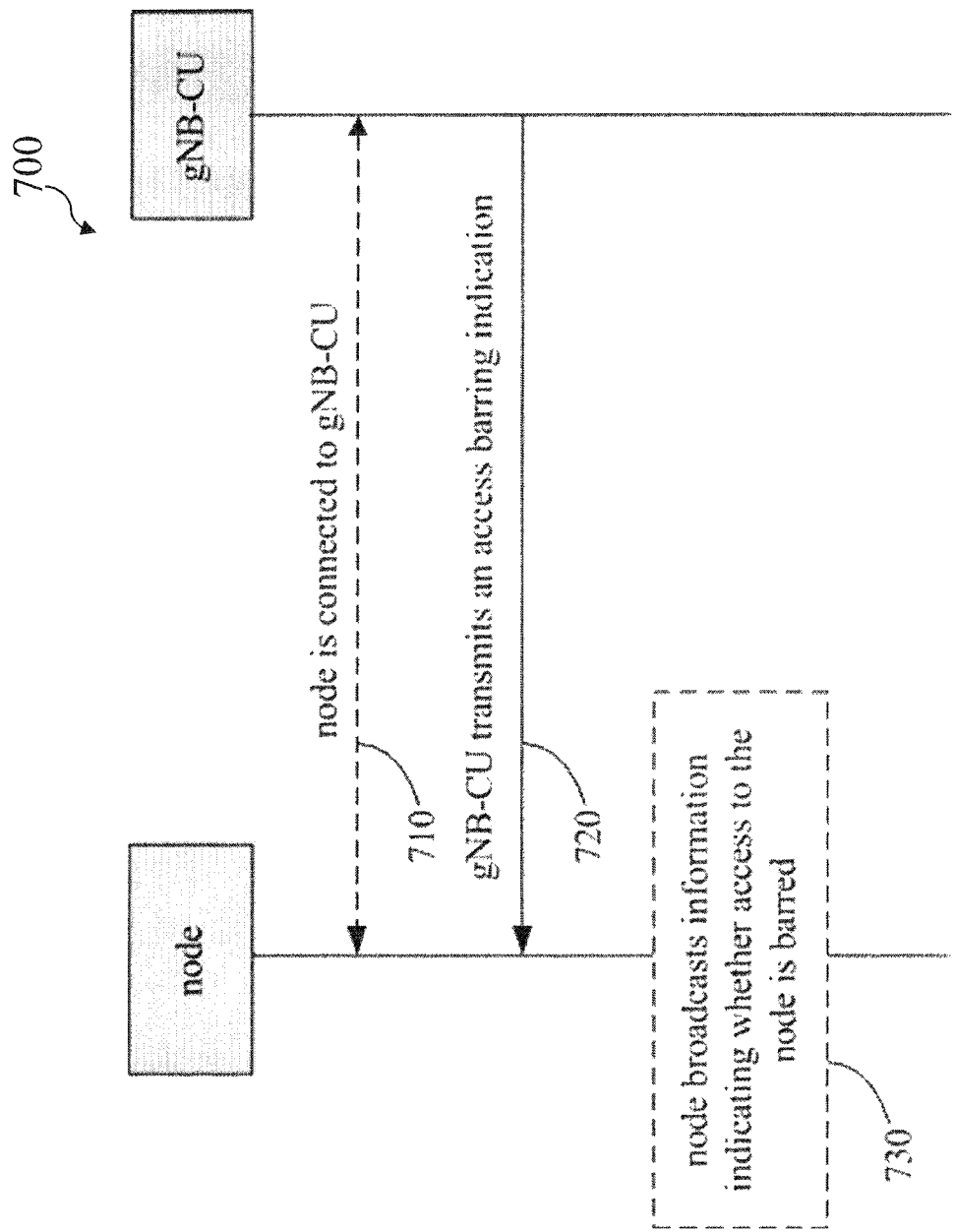
FIG. 7 illustrates a flow chart of an exemplary procedure for handling a connection request according to an embodiment of the present disclosure.

FIG. 7 illustrates a flow chart of an exemplary procedure 700 for handling the connection request according to an embodiment of the present disclosure.

At step 710, a node is connected to a CU of a gNB, i.e., gNB-CU in FIG. 7. The node may be an IAB node or a DU of the gNB (hereinafter, "gNB-DU"). For example, referring to FIG. 5, IAB node 520B is accessing to gNB-CU 550A, and gNB-DU 540A1 and gNB-DU 540A2 are connected to gNB-CU 550A.

At step 720, gNB-CU may transmit a signaling message indicating an access barring indication at the node. The access barring indication may instruct the node not to allow new connection requests to the node.

In some embodiments of the present disclosure, the signaling message may indicate an access barring indication at an IAB node. For example, referring to FIG. 5, gNB-CU 550A may transmit a signaling message indicating an access barring indication at IAB node 520B. In some embodiments of the present disclosure, the signaling message may indicate that access to the node is not supported.

In some embodiments of the present disclosure, the signaling message may indicate an access barring indication at a gNB-DU. In some embodiments of the present disclosure, the signaling message may indicate that access to the gNB-DU is not supported. For example, referring to FIG. 5, gNB-CU 550A may transmit a signaling message indicating an access barring indication at gNB-DU 540A2. In some embodiments of the present disclosure, the signaling message may include information for F1AP signaling.

Preferably, in response to receiving the signaling message from the gNB-CU, at step 730, the node may broadcast information indicating whether access to the node is barred. The information is determined according to the signaling message. In some embodiments of the present disclosure, the information may be included in system information. In some embodiments of the present disclosure, the information may include an indicator having one bit. In an embodiment of the present disclosure, a first value of the indicator indicates that access to the node is barred, and a second value of the indicator indicates that the access to the node is not barred. For example, the first value may be equal to "0," and the second value may be equal to "1." Alternatively, the first value may be equal to "1," and the second value may be equal to "0."

In some embodiments of the present disclosure, after receiving the signaling message from the gNB-CU, the node may determine whether to allow new connection request to the node according to the signaling message. For example, the node may reject a connection request to the node in response to that the signaling message indicates that access to the node is not supported.

In some embodiments of the present disclosure, referring to FIG. 5, IAB node 520A may broadcast information indicating that access to IAB node 520A is barred. IAB node 520B and other nodes may receive the information from, for example, system information. IAB node 520B may attempt to re-establish the backhaul link according to the procedure described above with respect to FIG. 6. In an embodiment of the present disclosure, IAB node 520B will not select IAB node 520A as a suitable node or a candidate node for re-establishment. In another embodiment of the present disclosure, IAB node 520B will not include IAB node 520A in the measurement report.

Figure 8:
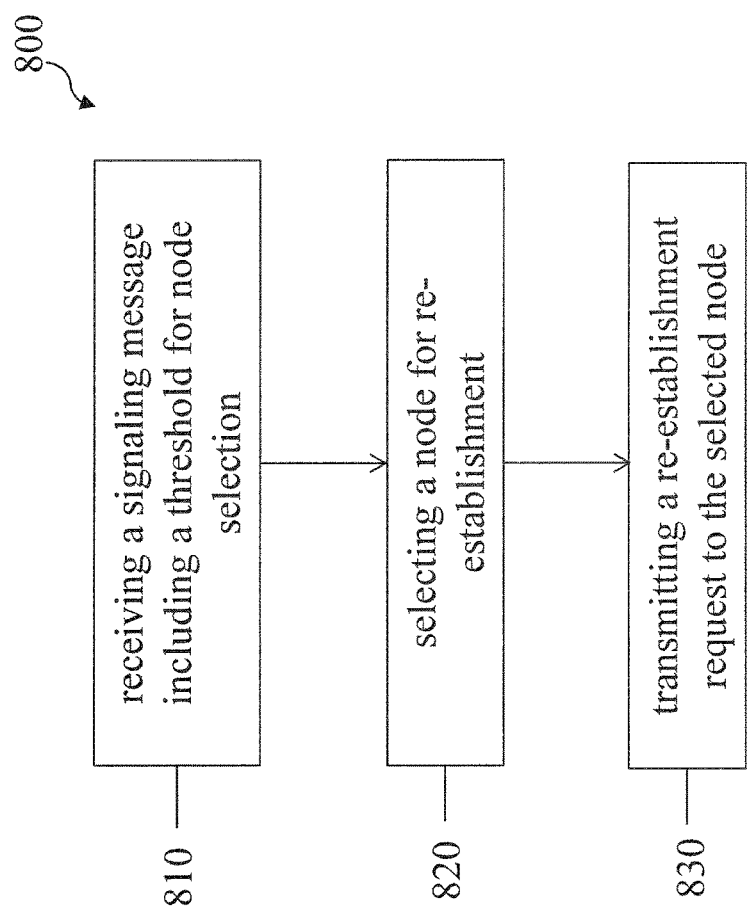
FIG. 8 illustrates a flow chart of an exemplary procedure for selecting a node according to an embodiment of the present disclosure.

FIG. 8 illustrates a flow chart of an exemplary procedure 800 for selecting a node according to an embodiment of the present disclosure. In some embodiments of the present disclosure, the procedure in FIG. 8 may occur in response to a RLF in the backhaul link. For example, the procedure in FIG. 8 may be applied to FIG. 6.

At step 810, an IAB node may receive a signaling message including a threshold for node selection. In some embodiments of the present disclosure, the signaling message may include information for RRC signaling. In some embodiments of the present disclosure, the signaling message is received from a CU of a BS. In this case, the IAB node is accessing to the CU of the BS through multiple hops. For example, referring to FIG. 5, IAB node 520B may receive a signaling message including a threshold for node selection from gNB-CU 550A.

At step 820, the IAB node may select a node for re-establishment. In some embodiments of the present disclosure, the IAB node may select the node for re-establishment in response to a failure in the backhaul link. For example, referring to FIG. 5, IAB node 520B may select a node for re-establishment in response to the failure in the backhaul link between gNB 510A and IAB node 520B.

In some embodiments of the present disclosure, the IAB node may select the node for re-establishment from at least one suitable node. In some embodiments of the present disclosure, the IAB node may select the at least one suitable node. In an embodiment of the present disclosure, the IAB node may determine a node as the suitable node in the case that it is determined that the channel quality of the channel between the node and the IAB node is equal to or greater than the threshold for node selection. For example, referring to FIG. 5, for IAB node 520B, IAB node 520A may be a suitable node in the case that the channel quality of the channel between IAB node 520A and IAB node 520B is equal to or greater than the threshold.

In some embodiments of the present disclosure, the IAB node may determine a node as a suitable node based on node priority. In an embodiment of the present disclosure, a node connected to the same BS as IAB node may have a higher node priority than a node connected to a different BS than the IAB node. For example, referring to FIG. 5, for IAB node 520B, IAB node 520A may have a higher node priority than IAB node 520D. In some embodiments of the present disclosure, the at least one suitable node and the IAB node are connected to the same BS. In some embodiments of the present disclosure, each of the at least one suitable node is connected to a different BS than the IAB node.

In some embodiments of the present disclosure, there may be only one suitable node. The IAB node may select this suitable node as the node for re-establishment. In some embodiments of the present disclosure, there may be a plurality of suitable nodes. In some embodiment of the present disclosure, the IAB node may randomly select the node for re-establishment from the plurality of suitable nodes with equal probability. In some embodiments of the present disclosure, the IAB node may select one of the plurality of suitable nodes as the node for re-establishment in the case that it is determine that the channel quality of the channel between the selected node and the IAB node has the best channel quality. In a preferred embodiment of the present disclosure, the IAB node may sort the plurality of suitable nodes according to their channel conditions, and may select one of the plurality of suitable nodes as the node for re-establishment according to a best channel quality.

In a preferred embodiment of the present disclosure, the IAB node may determine whether there is any candidate node available for backhaul link re-establishment. For example, it is checked whether there are neighboring IAB nodes available for backhaul link re-establishment. In the case that it is determined that there is no available candidate node, the IAB node may transmit a signaling message indicating the failure in the backhaul link to its downstream nodes.

Otherwise, in the case that it is determined that there are at least one candidate node for backhaul link re-establishment, the IAB node may determine a first group of suitable nodes from the at least one candidate node. The determination of the first group of suitable nodes is similar to the procedure described above with respect to FIG. 6. The IAB node may further determine a second group of suitable nodes from the first group of suitable nodes, wherein each node in the second group and the IAB node may be connected to the same base station. The IAB node may further determine a third group of suitable nodes from the first group, wherein each node in the third group may be connected to a different base station than the IAB node. The IAB node may select a node for re-establishment from the second group as the node for re-establishment in priority compared to selecting one node from the third group.

In some embodiments of the present disclosure, the channel quality of a channel may be determined based on at least one of the following: RSRP, RSSI or RSRQ. In a preferred embodiment of the present disclosure, the channel quality of a channel may be determined based on RSRP. Other channel quality metrics may also be employed.

At step 830, the IAB node may transmit a re-establishment request to the selected node. In some embodiments of the present disclosure, the re-establishment request may include cause indication for the failure in the backhaul link.

In some embodiments of the present disclosure, the IAB node may transmit assistant information to the selected node. In some embodiments of the present disclosure, the assistant information may include at least one of the following: load information of the IAB node, and at least one attribute of the IAB node. In an embodiment of the present disclosure, the at least one attribute includes the priority of the IAB node. The priority of the IAB node may indicate that the IAB node is of low, medium, or high priority. In some embodiments of the present disclosure, the assistant information is transmitted via Msg3 during a random access procedure as described above with respect to FIG. 4.

Figure 9:
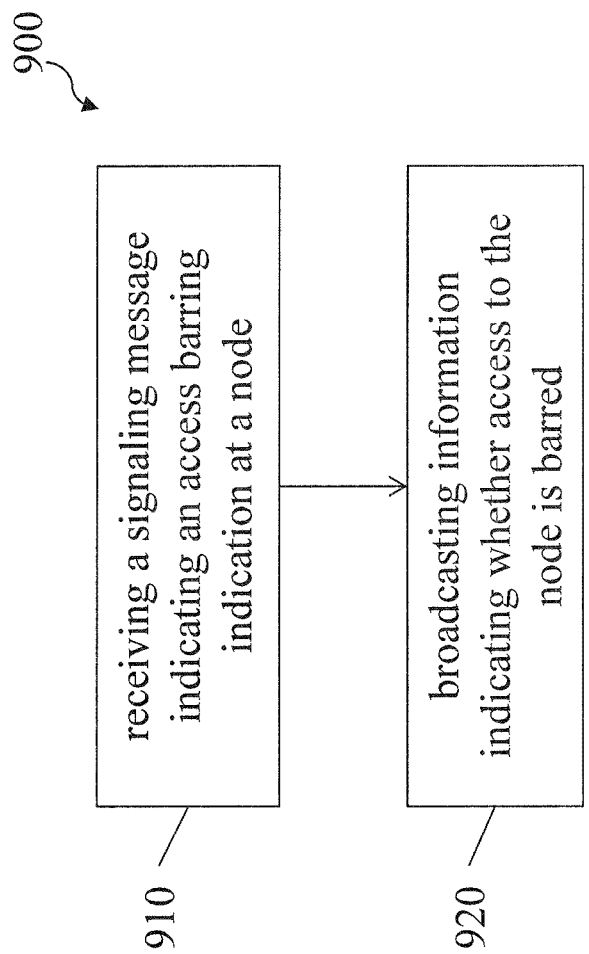
FIG. 9 illustrates a flow chart of an exemplary procedure for handling an access request according to an embodiment of the present disclosure.

FIG. 9 illustrates a flow chart of an exemplary procedure 900 for handling an access request according to an embodiment of the present disclosure. In some embodiments of the present disclosure, the procedure in FIG. 9 may occur when it is determined that the backhaul links or a BS is overloaded.

At step 910, a node may receive a signaling message indicating an access barring indication at the node. The access barring indication may instruct the node not to allow new connection requests to the node. In some embodiments of the present disclosure, after receiving the signaling message, the node may determine whether to allow new connection request to the node according to the signaling message. For example, the node may reject a connection request to the node in response to that the signaling message indicates that access to the node is not supported.

In some embodiments of the present disclosure, the signaling message is received from a CU of a BS. For example, referring to FIG. 5, gNB-CU 550A may transmit the signaling message.

In some embodiments of the present disclosure, the node may be an IAB node. For example, referring to FIG. 5, IAB node 520B may receive a signaling message indicating an access barring indication at IAB node 520B. In some embodiments of the present disclosure, the signaling message may indicate that access to the IAB node is not supported.

In some embodiments of the present disclosure, the node may be a DU of the BS. For example, referring to FIG. 5, gNB-DU 540A2 may receive a signaling message indicating an access barring indication at gNB-DU 540A2. In some embodiments of the present disclosure, the signaling message may include information for F1AP signaling.

At step 920, the node may broadcast information indicating whether access to the node is barred. The information may be determined according to the received signaling message.

In some embodiments of the present disclosure, the information may be included in system information. In some embodiments of the present disclosure, the information may include an indicator having one bit. In an embodiment of the present disclosure, a first value of the indicator indicates that access to the node is barred, and a second value of the indicator indicates that the access to the node is not barred. For example, the first value may be equal to "0," and the second value may be equal to "1." Alternatively, the first value may be equal to "1," and the second value may be equal to "0."

Figure 10:
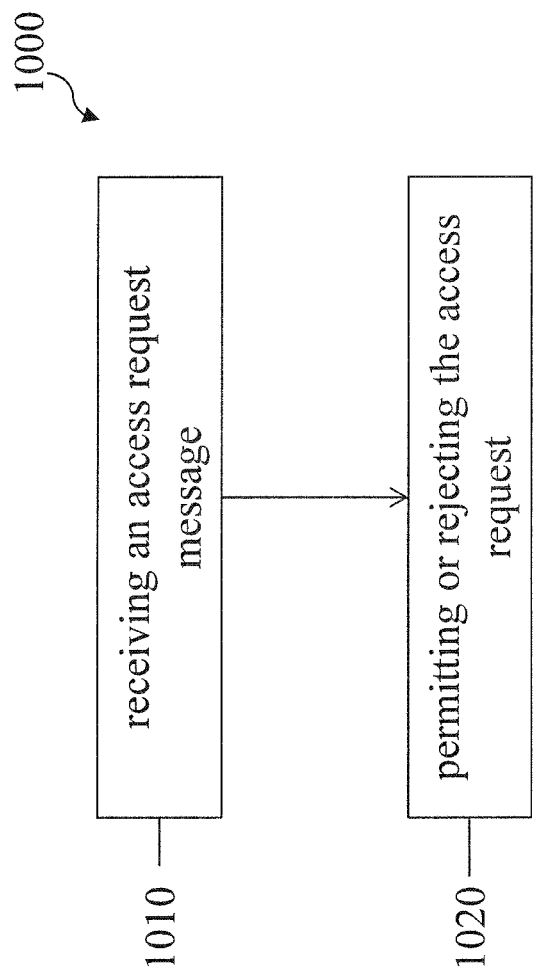
FIG. 10 illustrates a flow chart of an exemplary procedure for handling an access request according to an embodiment of the present disclosure.

FIG. 10 illustrates a flow chart of an exemplary procedure 1000 for handling access request according to an embodiment of the present disclosure.

At step 1010, a BS may receive an access request message from an IAB node. The access request message may include a re-establishment request of the IAB node. For example, referring to FIG. 5, gNB-CU 550A or gNB-CU 550B may receive an access request message from IAB node 520B. In some embodiments of the present disclosure, the access request message may include cause indication for a failure in a backhaul link.

In some embodiments of the present disclosure, the BS may further receive assistant information from the IAB node. In some embodiments of the present disclosure, the assistant information includes at least one of the following: load information of the IAB node and at least one attribute of the IAB node. In an embodiment of the present disclosure, the at least one attribute includes the priority of the IAB node, which may indicate that the IAB node is of low, medium, or high priority. In some embodiments of the present disclosure, the assistant information is transmitted via Msg3 during a random access procedure.

At step 1020, the BS may determine whether or not to admit the access from the IAB node. In other words, the BS may permit or reject the access request. In some embodiments of the present disclosure, the determination of whether or not to admit the access is based on the assistant information or other information.

In some embodiments of the present disclosure, the BS may permit the access request in the case that the IAB node has a high priority. In some embodiments of the present disclosure, the BS may reject the access request in the case that the BS or the corresponding backhaul link is overloaded.

Figure 11:
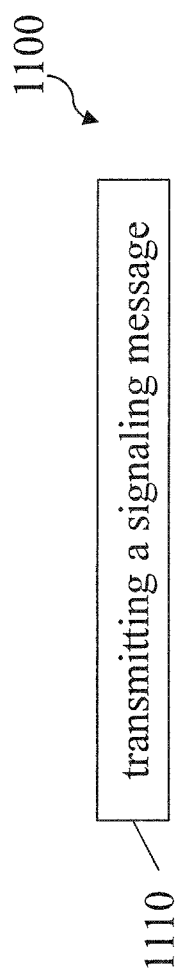
FIG. 11 illustrates a flow chart of an exemplary procedure for node selection and access control according to an embodiment of the present disclosure.

FIG. 11 illustrates a flow chart of an exemplary procedure 1100 for node selection and access control according to an embodiment of the present disclosure.

At step 1110, a BS may transmit a signaling message. In some embodiments of the present disclosure, the BS may be a CU of the BS.

In some embodiments of the present disclosure, the signal message may be a first signaling message indicating an access barring indication at a node. The access barring indication may instruct the node not to allow new connection requests to the node. In some embodiments of the present disclosure, the node may be an IAB node or a DU of the BS. Referring to FIG. 5, in one example, gNB-CU 550A may transmit a signaling message indicating an access barring indication at IAB node 520B. In another example, gNB-CU 550A may transmit a signaling message indicating an access barring indication at gNB-DU 540A2.

In some embodiments of the present disclosure, the signal message may be a second signaling message including a threshold for node selection. In some embodiments of the present disclosure, an IAB node may receive the second signaling message. In an embodiment of the present disclosure, the second signaling message may include information for RRC signaling. In some embodiments of the present disclosure, a DU of the BS may receive the second signaling message. In an embodiment of the present disclosure, the second signaling message may include information for F1AP signaling.

Figure 12:
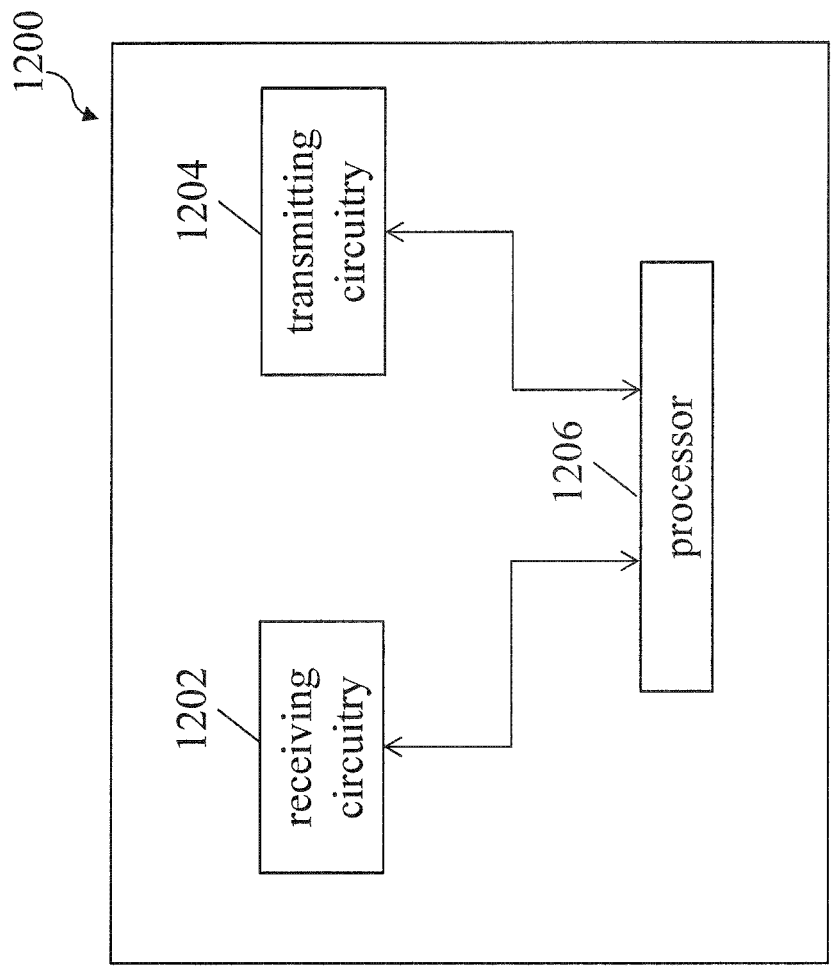
FIG. 12 illustrates an example block diagram of an apparatus according to an embodiment of the present disclosure.

FIG. 12 illustrates an example block diagram of an apparatus 1200 according to an embodiment of the present disclosure.

As shown in FIG. 12, the apparatus 1200 may include a non-transitory computer-readable medium (not shown), a receiving circuitry 1202, a transmitting circuitry 1204, and a processor 1206 coupled to the non-transitory computer-readable medium (not shown), the receiving circuitry 1202 and the transmitting circuitry 1204. The apparatus 1200 may be a BS or an IAB node. Although in this figure, elements such as processor 1206, transmitting circuitry 1204, and receiving circuitry 1202 are described in the singular, the plural is contemplated unless limitation to the singular is explicitly stated. In some embodiments of the present disclosure, the receiving circuitry 1202 and the transmitting circuitry 1204 are combined into a single device, such as a transceiver. In certain embodiments of the present disclosure, the apparatus 1200 may further include an input device, a memory, and/or other components.

In some embodiments of the present disclosure, the non-transitory computer-readable medium may have stored thereon computer-executable instructions to cause a processor to implement the method with respect to the IAB node as described above. For example, the computer-executable instructions, when executed, cause the processor 1206 interacting with receiving circuitry 1202 and transmitting circuitry 1204, so as to perform the steps with respect to the IAB node depicted in FIGS. 6-9.

In some embodiments of the present disclosure, the non-transitory computer-readable medium may have stored thereon computer-executable instructions to cause a processor to implement the method with respect to the base station as described above. For example, the computer-executable instructions, when executed, cause the processor 1206 interacting with receiving circuitry 1202 and transmitting circuitry 1204, so as to perform the steps with respect to the BS depicted in FIGS. 6, 7, 10, and 11.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

The following is what is claimed:

1. A method performed by a first node, the method comprising:
    receiving, at the first node, a signaling message indicating an access barring indication, the access barring indication indicating whether access to the first node is barred; and
    broadcasting, to a second node in response to receiving the signaling message, system information comprising an indicator indicating whether access to the first node is barred according to the access barring information, wherein,
        in response to the indicator indicating that access to the first node is not barred, the first node can be selected by the second node as a candidate for re-establishment of an integrated access and backhaul node; and
        in response to the indicator indicating that access to the first node is barred, the first node can not be selected by the second node as a candidate for re-establishment of an integrated access and backhaul node.

2. The method of claim 1, wherein the signaling message is received from a central unit of a base station.

3. The method of claim 1, wherein the first node comprises an integrated access and backhaul node or a distributed unit of a base station.

4. The method of claim 1, further comprising rejecting a connection request from the second node to the first node in response to that the signaling message indicates that access to the first node is not supported.

5. The method of claim 1, wherein the indicator has one bit, a first value of the indicator indicates that access to the first node is barred, and a second value of the indicator indicates that the access to the first node is not barred.

6. A first node, comprising:
    at least one memory; and
    at least one processor coupled with the at least one memory and configured to cause the first node to:
        receive, at the first node, a signaling message indicating an access barring indication, the access barring indication indicating whether access to the first node is barred; and
        broadcast, to a second node in response to receiving the signaling message, system information comprising an indicator indicating whether access to the first node is barred according to the access barring information, wherein,
            in response to the indicator indicating that access to the first node is not barred, the first node can be selected as a candidate for re-establishment of an integrated access and backhaul node; and
            in response to the indicator indicating that access to the second node is barred, the second node can not be selected as a candidate for re-establishment of an integrated access and backhaul node.

7. The first node of claim 6, wherein the signaling message is received from a central unit of a base station.

8. The first node of claim 6, wherein the first node comprises an integrated access and backhaul node or a distributed unit of a base station.

9. The first node of claim 6, wherein the at least one processor is configured to cause the first node to reject a connection request from the second node to the first node in response to that the signaling message indicates that access to the first node is not supported.

10. The first node of claim 6, wherein the indicator has one bit, a first value of the indicator indicates that access to the first node is barred, and a second value of the indicator indicates that the access to the first node is not barred.

* * * * *